Patented Jan. 2, 1940

2,185,185

UNITED STATES PATENT OFFICE 2,185,185

THIOCYANO-ALKYL ETHERS OF HALO-PHENOLS

Gerald H. Coleman, Midland, Mich., assignor to The Dow Chemical Company, Midland, Mich., a corporation of Michigan No Drawing. Application October 26, 1938, Serial No. 237,060

10 Claims. (Cl. 260—454)

The present invention concerns a new class of compounds, namely, the thiocyano-alkyl ethers of halo-phenols, and is particularly concerned with those thiocyano-alkyl ethers of halo-phenols wherein the alkyl residue of the thiocyano group contains from 2 to 5 carbon atoms, inclusive.

I have prepared representative members of this group of compounds and found them to be low-melting solids or viscous, high-boiling, water-white liquids, substantially insoluble in water, soluble in most petroleum distillate fractions, and somewhat soluble in organic solvents generally. These compounds are useful as insecticidal toxicants, particularly when dissolved in petroleum distillate fractions.

The above new compounds may be prepared by reacting a halo-alkyl ether of a halo-phenol with an alkali metal thiocyanate in the presence of alcohol. For example, an ether such as beta-(2,4,6-trichloro-phenoxy)-ethyl chloride and potassium thiocyanate are dispersed in absolute alcohol and the mixture heated to its boiling temperature and under reflux for a period of time sufficient to accomplish reaction. The temperature required is generally between 75° and 90° C., although somewhat lower or higher temperatures may be employed, the reaction being carried out under autogenous pressure where temperatures above the boiling point of the solution prevail. While any suitable proportion of the halo-alkyl ether and metallic thiocyanate may be employed, substantially equimolecular proportions thereof have been found to give the desired compound in good yield. The alcohol may be employed in amounts sufficient to retain the reactants and final ether product in solution. Following the reaction, the desired thiocyano ether compound is separated in any suitable manner. For example, the major part of the alcohol solvent may be distilled out of the reaction mixture and the residue diluted with water, whereupon a water-immiscible layer of the thiocyano-alkyl ether of the halo-phenol separates from solution. If desired, this compound may be recovered by extraction with a suitable solvent as benzene, the extract being fractionally distilled. In an alternate procedure, the water-immiscible layer may be separated as by decantation, washed with water, and used as an insecticidal toxicant without further purification, or such crude washed product may be purified.

The halo-alkyl ethers employed as reactants in the preparation of my new compounds can be obtained by reacting suitable metal halo-phenolates with dihalo aliphatic hydro-carbons, under such conditions of temperature and pressure as favor the replacement of a single halogen atom by the halophenoxy radical. Co-pending application Serial No. 139,580, filed April 28, 1937, by Coleman et al. describes the preparation of certain of these halo-alkyl ether compounds.

The following examples disclose in detail the preparation of a number of compounds falling within the scope of my invention but are not to be construed as limiting the same:

Example 1

189 grams (0.69 mol) of gamma-(2,4,6-trichlorophenoxy)-propyl chloride (boiling at 141° to 143° C. at 5 millimeters pressure), 67 grams (0.69 mol) of potassium thiocyanate, and 160 grams of absolute alcohol were mixed together and heated at 80° to 81° C. and under reflux for 48 hours. The reacted mixture was then fractionally distilled to remove the major part of the alcohol, and the distillation residue poured into an excess of water with stirring. A water-immiscible layer was separated from the water mixture by extraction with benzene, and the extract washed with water, dried over magnesium sulfate, and fractionally distilled. 125 grams of the gamma-thiocyano-propyl ether of 2,4,6-trichloro-phenol was thereby obtained as a colorless liquid boiling at 195° to 196° C. at 4 millimeters pressure, and having a specific gravity of 1.416 at 20°/4° C. A 3 per cent solution of this compound in kerosene, when tested by the Peet-Grady method, substantially as described in Soap, 8, No. 4 (1932), gave a knockdown of 100 per cent in ten minutes and a kill of 92 per cent in 48 hours against three-day old house flies.

Example 2

In a similar manner, a mixture of 130 grams (0.5 mol) of beta-(2,4,6-trichloro-phenoxy)-ethyl chloride (boiling at 140° to 142° C. at 6 millimeters pressure), 44.6 grams (0.55 mol) of sodium thiocyanate, and 200 grams of absolute alcohol was heated at 82° C. and under reflux for a period of 30 hours. The thiocyano-alkyl ether product was recovered by fractional distillation, whereby there was obtained 37 grams of the beta-thiocyano-ethyl ether of 2,4,6-trichloro-phenol as a white, crystalline solid boiling at 185°–186° C. at 3 millimeters pressure, and having a melting point of 43.5° C. A 3 per cent solution of this compound in kerosene, when tested as described in Example 1, gave a knockdown of 95 per cent in ten minutes and a kill of 77 per cent in 48 hours against three-day old house flies.

*Example 3*

A similar reaction was obtained between 153 grams (0.8 mol) of the beta-chloro-ethyl ether of 4-chloro-phenol and 60 grams (0.8 mol) of potassium thiocyanate in 600 milliliters of absolute alcohol. After 48 hours of refluxing at 79° to 81° C., the crude reaction mixture was fractionally distilled, whereby there was obtained 70 grams (0.3 mol) of the beta-thiocyano-ethyl ether of 4-chloro-phenol. This compound is a viscous liquid boiling at 153° to 155° C. at 3 millimeters pressure and having a specific gravity of 1.286 at 20°/4° C. A 3 per cent kerosene solution of this compound knocked down 100 per cent in 10 minutes and killed 95 per cent in 48 hours against three-day old house flies.

*Example 4*

In like manner, 94.2 grams (0.4 mol) of beta-chloro-ethyl ether of 4-bromo-phenol, 38.9 grams (0.4 mol) of potassium thiocyanate, and 160 grams of absolute alcohol were mixed together and reacted to form the beta-thiocyano-ethyl ether of 4-bromo-phenol, a compound boiling at 181° to 182° C. at 3 millimeters pressure. A 3 per cent solution of this compound in kerosene, when tested according to the Peet-Grady method, gave a knockdown of 100 per cent in ten minutes and a kill of 86 per cent in 48 hours against three-day old house flies.

Other halo-alkyl ethers of the halo-phenols which may be substituted for those shown in the examples to produce thiocyano-alkyl ethers of the halo-phenols falling within the scope of this invention include: beta-(2-chloro-phenoxy)-ethyl chloride, boiling at 142° to 144° C. at 21.5 millimeters pressure; beta-(2,4-dichloro-phenoxy)-ethyl chloride, boiling at 134° to 135° C. at 5.5 millimeters pressure; beta-(4-chloro-phenoxy)-propyl chloride, boiling at 182° to 184° C. at 2 millimeters pressure; beta-(2,4-dichloro-phenoxy)-propyl chloride, boiling at 142° to 144° C. at 7 millimeters pressure; gamma-(4-bromo-phenoxy)-propyl chloride, boiling at 150° to 151° C. at 15 millimeters pressure; 4-chloro-phenoxy-butyl chloride, boiling at 122° to 125° C. at 5 millimeters pressure; gamma-(4-chloro-phenoxy)-isobutyl chloride, boiling at 130° to 133° C. at 4.5 millimeters pressure; gamma-(4-bromo-phenoxy)-isobutyl chloride, boiling at 120°–122° C. at 2 millimeters pressure; and the like.

In a similar manner, thiocyano-alkyl ethers of halo-phenols may be prepared such as beta-thiocyano-ethyl ether of pentachlorophenol, beta-thiocyano-ethyl ether of 2,4,6-tribromo-phenol, beta-thiocyano-ethyl ether of 2,4,5-trichloro-phenol, beta-thiocyano-ethyl ether of 2,4,5-trichloro-6-bromo-phenol, beta-thiocyano-propyl ether of 2,4,6-trichloro-phenol, beta-thiocyano-propyl ether of 2,4-dichloro-phenol, gamma-thiocyano-propyl ether of 2-bromo-4-chloro-phenol, gamma-thiocyano-propyl ether of 3-chloro-phenol, gamma-thiocyano-isobutyl ether of 2,4,6-trichloro-phenol, thiocyano-pentyl ether of 4-chloro-phenol, beta-thiocyano-ethyl ether of 4-iodo-phenol, and the like.

I claim:

1. A thiocyano-alkyl ether of a halo-phenol.
2. A thiocyano-alkyl ether of a polyhalo-phenol.
3. A thiocyano-alkyl ether of a mono-halo-phenol.
4. A thiocyano-alkyl ether of a halo-phenol, wherein the alkyl residue of the thiocyano group contains from 2 to 5 carbon atoms, inclusive.
5. A beta-thiocyano-ethyl ether of a halo-phenol.
6. A beta-thiocyano-ethyl ether of a polyhalo-phenol.
7. A beta-thiocyano-ethyl ether of a chloro-phenol.
8. A beta-thiocyano-ethyl ether of a bromo-phenol.
9. The beta-thiocyano-ethyl ether of 2,4,6-trichloro-phenol.
10. The gamma-thiocyano-propyl ether of 2,4,6-trichloro-phenol.

GERALD H. COLEMAN.